UNITED STATES PATENT OFFICE.

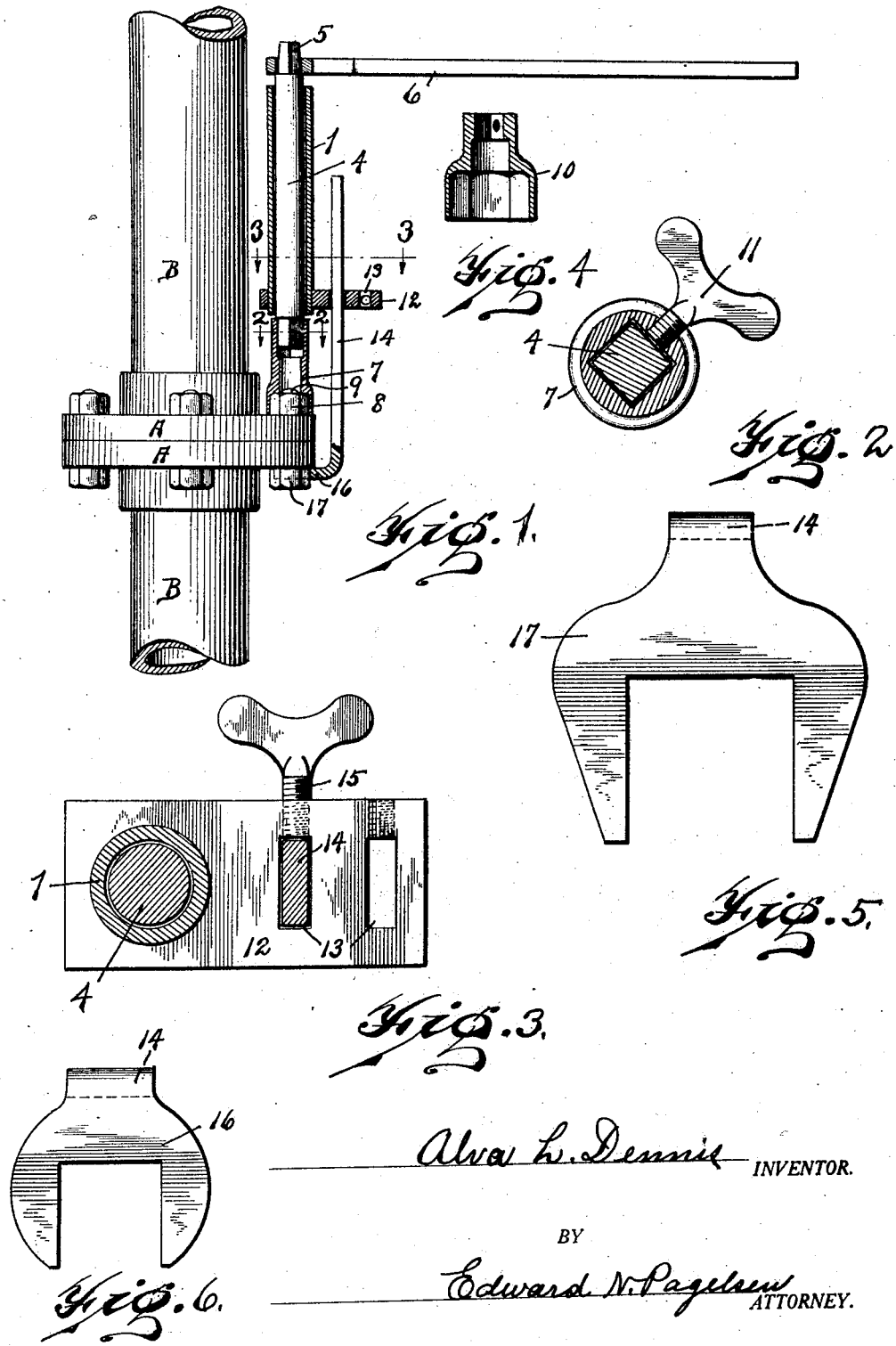

ALVA L. DENNIS, OF DETROIT, MICHIGAN.

FLANGE WRENCH.

1,406,824.  Specification of Letters Patent.  Patented Feb. 14, 1922.

Application filed March 2, 1921. Serial No. 449,069.

*To all whom it may concern:*

Be it known that I, ALVA L. DENNIS, a citizen of the United States, and residing at Detroit, in the county of Wayne and State of Michigan, have invented a new and Improved Flange Wrench, of which the following is a specification.

This invention relates to means for screwing down the nuts on the bolts which connect the flanges of couplings for the ends of pipes and wherever else it is difficult to use ordinary tools to turn the nut and at the same time prevent the bolt from turning, and the object of this invention is to provide a strong, readily adjustable and simple wrench with interchangeable bolt and nut engaging devices so that it may be adapted for bolts of a number of different sizes.

This invention consists in the combination of a tubular guide and a stem rotatable therein, a socket at the inner end of the stem to engage a nut, a bracket attached to the tubular guide and formed with a plurality of slots, and a bolt holder slidable in one of the slots in the bracket and formed with a claw at its outer end to receive the head of the bolt whose nut is engaged by the socket.

It further consists in supplying this wrench with a series of interchangeable sockets and with a series of bolt holders so as to adapt this tool for use with bolts and nuts of a number of different sizes.

In the accompanying drawing, Fig. 1 is an elevation of two pipes connected by means of a flanged coupling, and a longitudinal section of this improved flange wrench. Figs. 2 and 3 are sections on the lines 2—2 and 3—3 of Fig. 1. Fig. 4 is a section of a nut socket adapted for a larger sized nut than that shown in Fig. 1. Figs. 5 and 6 are bottom plans of the claws at the lower end of bolt holders.

Similar reference characters refer to like parts throughout the several views.

The flanged couplings A which unite steam and water pipes B are often located in places where it is most difficult if not impossible to use ordinary tools. The present tool is designed to screw down the nuts on bolts employed to secure the flanges of such couplings together and also to hold itself in position while the work is going on. The intention is to provide a tool of this character which cannot be displaced except by intentionally disconnecting it.

The tool comprises a tubular guide 1 in which the stem 4 is rotatably held and the guide is of such length that while the stem is loose therein, it is held in the desired position. The upper end 5 of the stem is preferably squared to receive a wrench 6 by means of which it may be turned and the lower end is also preferably squared to receive a selected socket 7 which fits the nut 8 on the bolt 9. In Fig. 4, a socket 10 adapted for much larger nuts is shown on the same scale as Fig. 1, and in practice, one tool of this character when supplied with six sockets is readily adapted for bolts ranging from one-half inch to one and one-quarter inches in diameter. A screw 11 may be used to hold the sockets on the stem.

Attached to the tubular guide 1 is a bracket 12 having slots 13 through which the shank 14 of the bolt holder may extend, being held in position by a screw 15. The lower or outer end of this holder is formed with a claw 16 adapted to engage the head 17 of the bolt 9. By slacking up the screw 15 occasionally and sliding the shank 14 up in its slot and then tightening the screw, the tool may be kept securely attached in position and cannot be removed by the pull of the wrench.

A special claw is necessary for each size of bolt head, and the proper number of bolt holders is therefore supplied. As the distance from the centers of the bolts to the circumference of the flanges increases with the larger sizes (Fig. 5), the shanks 14 of these bolt holders are spaced different distances from the middles of the claws. This variation is provided for by forming the bracket 12 with a plurality of slots 13.

It will be understood that while I have particularly described the use of this wrench on the bolts uniting the flanges of a pipe coupling, its use is not limited thereto, but may be employed wherever a bolt extends through holes in two adjacent pieces sufficiently near the edges of these pieces to permit engagement of the bolt head and nut. It will also be understood that the socket may engage the bolt head and the claw on the bolt holder engage the nut, when this is found necessary.

The details of construction and the proportions of the parts may all be changed without departing from the spirit of my invention as set forth in the following claim.

I claim:—

In a flange wrench, the combination of a tubular guide and a bracket attached thereto, said bracket being provided with a plurality of slots, a stem rotatably mounted in the tubular guide, a selected nut socket of a series removably attached to the inner end of the stem, a selected bolt holder of a series having a shank slidable in one of the slots in the bracket and having a claw on its outer end to receive the head of a bolt, and a screw to lock the bolt holder in the bracket.

ALVA L. DENNIS.